United States Patent [19]
Akao et al.

[11] Patent Number: 4,851,115
[45] Date of Patent: Jul. 25, 1989

[54] SEPARATOR WITH MOVABLE RECEPTACLES

[75] Inventors: Takeshi Akao, Abiko; Morihiko Sakai, Noda; Katsumichi Ohsaki, Noda; Muneki Yamada, Noda, all of Japan

[73] Assignee: Kikkoman Corporation, Noda, Japan

[21] Appl. No.: 218,727

[22] Filed: Jul. 13, 1988

[30] Foreign Application Priority Data

Jul. 14, 1987 [JP] Japan .................. 62-174004

[51] Int. Cl.$^4$ ............................................ B01D 15/00
[52] U.S. Cl. ..................................... 210/189; 210/232; 210/239; 210/267; 210/282; 210/284; 422/69; 422/116; 422/209; 435/288
[58] Field of Search ............... 210/142, 189, 232, 239, 210/240, 267, 282, 283, 284, 343, 417; 435/288, 300; 422/69, 70, 101, 116, 209

[56] References Cited

U.S. PATENT DOCUMENTS

| | | | |
|---|---|---|---|
| 2,323,830 | 7/1943 | McMillan | 210/282 |
| 3,392,835 | 7/1968 | Asper | 210/142 |
| 3,404,780 | 10/1968 | Jungher | 210/142 |
| 3,490,879 | 1/1970 | Urban | 422/209 |
| 4,522,726 | 6/1985 | Berru et al. | 210/267 |
| 4,728,502 | 3/1988 | Hamill | 422/116 |

FOREIGN PATENT DOCUMENTS

| | | | |
|---|---|---|---|
| 833339 | 2/1970 | Canada | 210/189 |
| 54-138869 | 10/1979 | Japan . | |
| 56-15820 | 2/1981 | Japan . | |
| 56-45727 | 4/1981 | Japan . | |
| 59-74993 | 4/1984 | Japan . | |

Primary Examiner—Richard V. Fisher
Assistant Examiner—Christopher Upton
Attorney, Agent, or Firm—Schwartz & Weinrieb

[57] ABSTRACT

A separator comprises a central casing including an upper disk and a lower disk, both disks having a plurality of openings, and a plurality of columns extending between the upper and lower disks and in communication with the plurality of openings, an upper casing including a disk disposed in contact with the upper disk of the central casing and having a plurality of openings, and a plurality of columns extending upwardly from the upper surface of the disk and in communication with the plurality of columns of the central casing, a lower casing including a disk disposed in contact with the lower disk of the central casing and having a plurality of openings, and a plurality of columns extending downwardly from the lower surface of the disk and in communication with the plurality of columns of the central casing, and a plurality of receptacles disposed within the plurality of columns. The upper and lower casings are rotated so that the receptacles can be circulated through the columns.

19 Claims, 17 Drawing Sheets

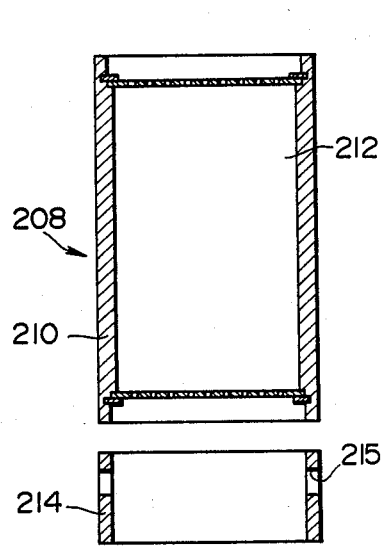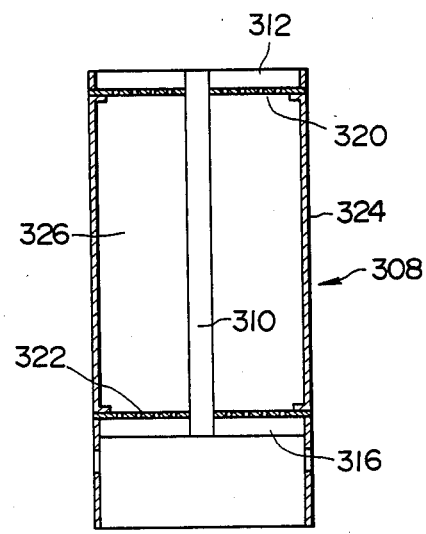
FIG.14  FIG.15
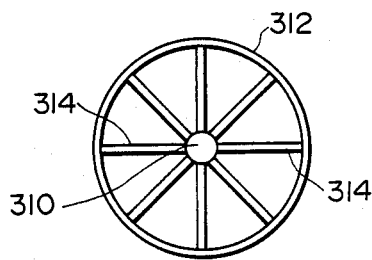
FIG.16

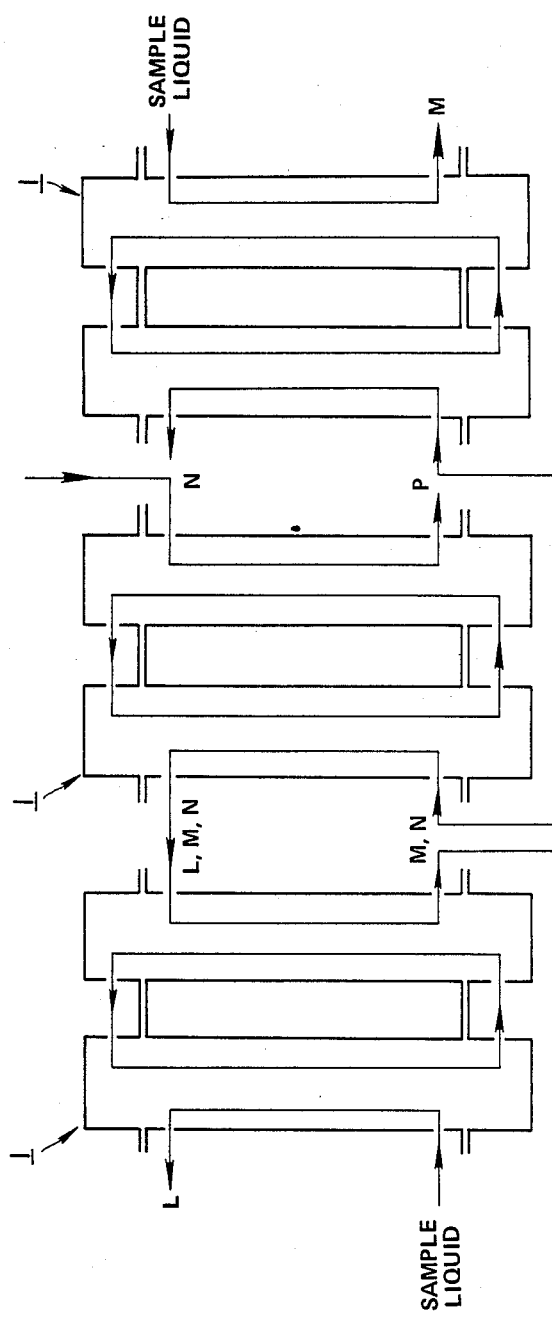
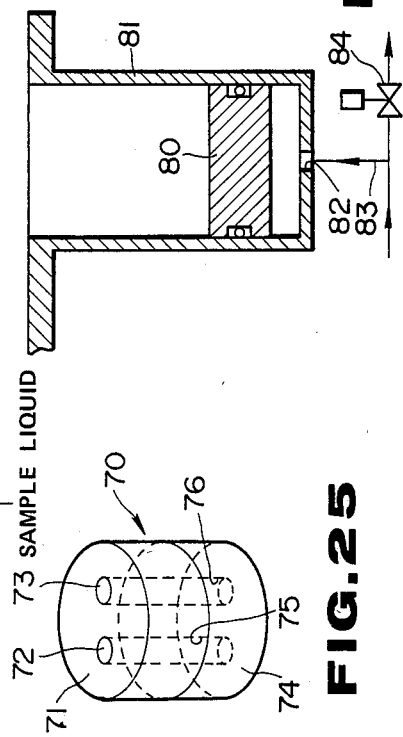

SEPARATOR WITH MOVABLE RECEPTACLES

BACKGROUND OF THE INVENTION

1. Field of the Invention

The present invention generally relates to separators and more particularly, to a system employing a plurality of receptacles in which separation and isolation, for example, of solid and liquid components from each other is continuously carried out.

2. Description of the Prior Art

A wide variety of separators have heretofore been proposed to absorb a particular constituent of a mixture by means of an absorbent or to dissolve particular constituents of a mixture by means of aliquid having solvent properties for only one of the constituents.

Japanese patent publication No. 56-15820, laid-open on Feb. 16, 1981, discloses a separator which comprises an annular casing adapted to receive a receptacle therein. The receptacle has a plurality of chambers in which carbon molecular sieves are contained. When air under pressure is introduced into one of the chambers, only oxygen is absorbed within the carbon molecular sieve, whereas nitrogen is discharged from the chamber. The separation of air into the major components or the concentration of oxygen from the air is continuously effected while the casing is being rotated by means of a motor. A similar separator is also disclosed in Japanese patent publication No. 54-138869, laid-open on Oct. 27, 1979. These prior art separators, however, require a considerable amount of floor space.

Japanese patent publication No. 59-74993, laid-open on Apr. 27, 1984, uses a plurality of receptacles housed within a casing and having a net structure. Each of the receptacles has therein an immobilized enzyme for achieving a fermentation reaction and is moved within the casing in its longitudinal direction. This prior art apparatus not only requires a large amount of floor space, but also requires large operational seals.

Japanese patent publication No. 56-45727, laid-open on Apr. 25, 1981, employs a plurality of receptacles or units within which suitable absorbent is contained, the units being arranged one above the other in a column. When exhaust gas, for example, is introduced into the column through means of an inlet, sulfenic-oxides (SOx) are absorbed within the absorbent. The lowermost unit is then removed from the column, and the new unit is superposed upon the uppermost unit of the column. When such an exchange of units takes place, the separator must be stopped. This results in an inefficient operation.

OBJECT OF THE INVENTION

It is, therefore, an object of this invention to provide a separator with movable receptacles, which enables continuous and efficient separation.

SUMMARY OF THE INVENTION

According to the present invention, there is provided a separator comprising a central casing which comprises an upper disk and a lower disk, both disks having a plurality of openings, and a plurality of columns extending between the upper and lower disks so as to be in communication with the plurality of openings, an upper casing comprising a disk which is placed in contact with the upper disk of the central casing and having a plurality of openings, and a plurality of columns extending upwardly from the upper surface of the disk and which are in communication with the plurality of columns of the central casing, a lower casing comprising a disk which is placed in contact with the lower disk of the central casing and having a plurality of openings, and a plurality of columns extending downwardly from the lower surface of the disk and which are in communication with the plurality of columns of the central casing, a plurality of receptacles disposed within the plurality of columns, means for moving the receptacles through the plurality of columns, and means for rotating the upper and lower casings about a central axis thereof.

BRIEF DESCRIPTION OF THE DRAWINGS

A better understanding of the invention may be had by reference to the following description when taken in conjunction with the accompanying drawings, in which:

FIGS. 13 through 15 show various modifications of the receptacle shown in FIG. 1;

FIG. 16 is a plan view of the receptacle shown in FIG. 15;

FIGS. 18 through 24 are schematic views of the system in use;

FIG. 25 is an enlarged view of a modification of a valve assembly shown in FIG. 1;

FIG. 26 is an enlarged sectional view showing a portion of the lower casing in alternative form;

DESCRIPTION OF THE PREFERRED EMBODIMENTS

Figure 1:
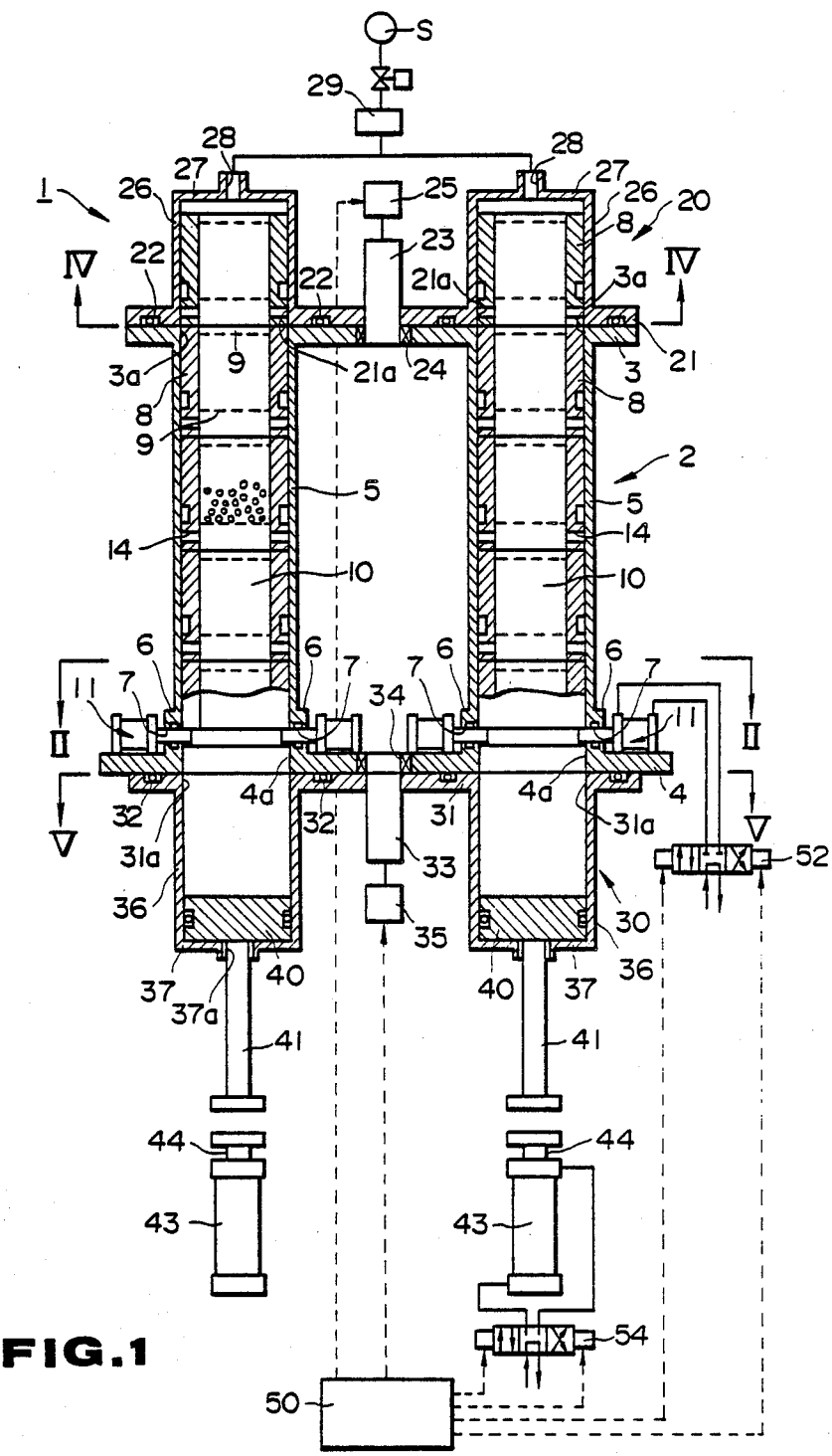
FIG. 1 is a vertical section of a separator with movable receptacles according to the present invnetion.
Figure 2:
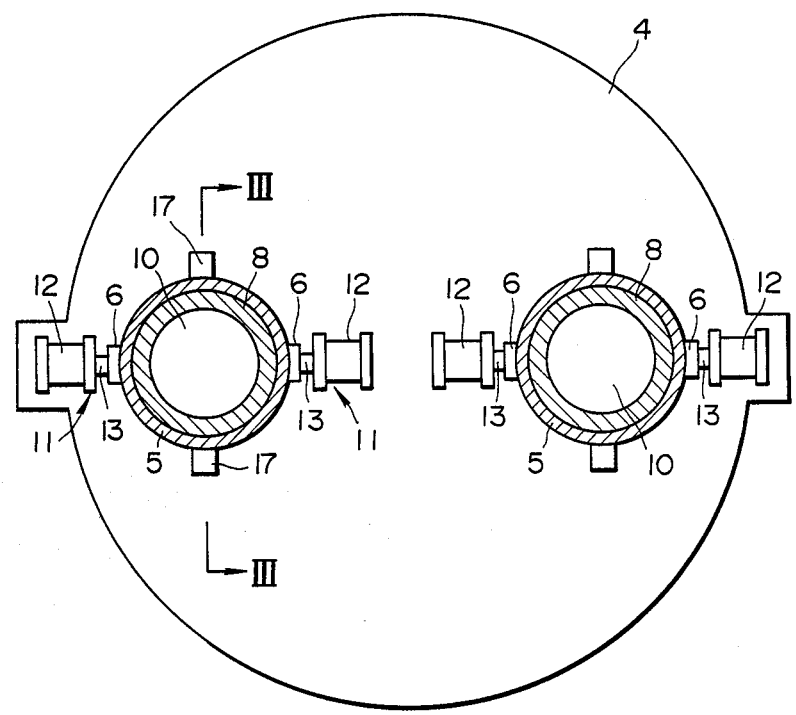
FIG. 2 is a sectional view taken along the line II—II of FIG. 1, showing the lower disk of a central casing.

With reference to FIGS. 1 and 2, there is shown a separator constructed according to the present invention and generally indicated at 1. The separator 1 generally includes a fixed central housing or casing 2. The casing 2 includes an upper disk 3 and a lower disk 4, both disks having two diametrically opposed apertures 3a and 4a, respectively. Disposed between the upper disk 3 and the lower disk 4 are two cylindrical tubes or hollow columns 5, each column 5 having at its lower end two diametrically opposed bosses 6 through which two radial holes 7 extend. A suitable number of cylindrical units or receptacles 8 are axially movable within the columns 5. Each of the receptacles 8 has screens 9 disposed within the vicinity of its opposite ends so as to define a chamber 10 within which absorbent or another type of agent is contained.

Figure 3:
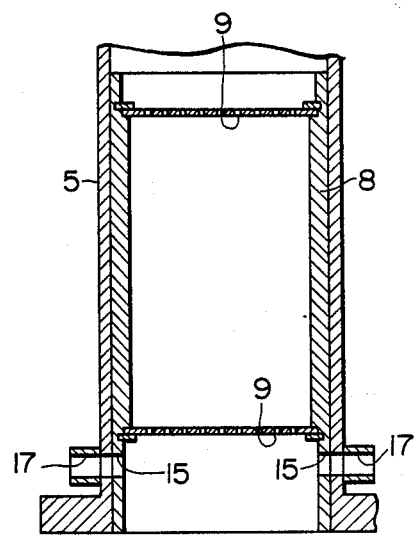
FIG. 3 is an enlarged sectional view showing the lower portion of a column of the central casing of FIG. 1.

The receptacles 8 are held within the columns 5 by means of holders 11 placed upon the lower disk or plate 4. More specifically, each of the holders 11 includes a pair of cylinders 12 disposed adjacent each column 5. Each cylinder 12 has a rod 13 which extends through the radial hole 7 into a recess 14 formed within the outer peripheral surface of each receptacle 8 so as to hold the receptacles 8 in position. In the illustrated embodiment, the receptacles 8 within the columns 5 are four in number, and the overall height of these four receptacles 8 is substantially equal to that of the column 5 of the central casing 2. As shown in FIG. 3, each receptacle 8 has two diametrically opposed openings 15 which are in communication with corresponding ports 17 defined within the column 5.

Figure 4:
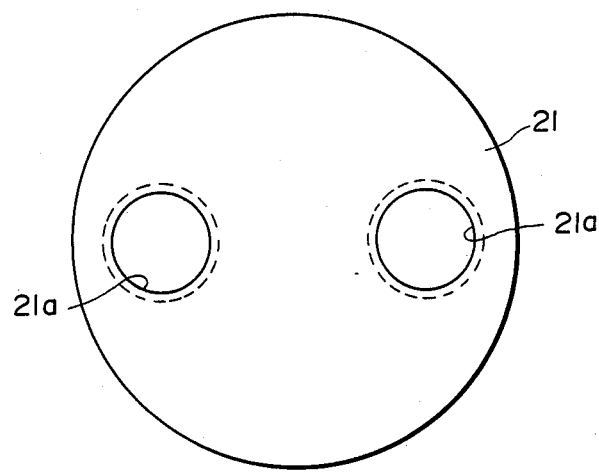
FIG. 4 is a sectional view taken along the line IV—IV of FIG. 1.

With reference to FIGS. 1 and 4, an upper rotary casing 20 comprises a disk 21 which is held in contact with the upper surface of the upper disk 3 of the casing 2 and which is hermetically sealed therewith by means of O-rings 22. The disk 21 has two diametrically opposed apertures 21a and at its center a fixed shaft 23 whih is journaled within the upper disk 3 of the casing 2 through means of a bearing assembly 24 and which is connected to a motor 25. Upon actuation of the motor 25, the upper rotary casing 20 is rotated about the axis of shaft 23. Two columns 26 extend upwardly from the upper surface of the disk 21. Each of these two columns 26 has an upper end closed by means of a cover 27 and a lower end disposed in communication with the aperture 21a. Each cover 27 has a port 28 through which suitable fluid is introduced into the casing. The port 28 is connected through means of a rotary joint 29 to a source of fluid S. In its normal operating orientation, the two columns 26 are in communication with the two columns 5 through means of the apertures 3a of the upper disk 3 and the apertures 21a of the disk 21. In the illustrated embodiment, the columns 26 are each sized so as to receive one receptacle therewithin.

Figure 5:
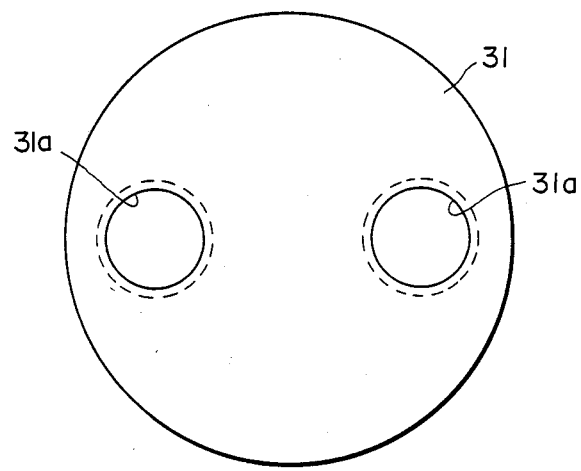
FIG. 5 is a sectional view taken along the line V—V of FIG. 1.
Figure 6:
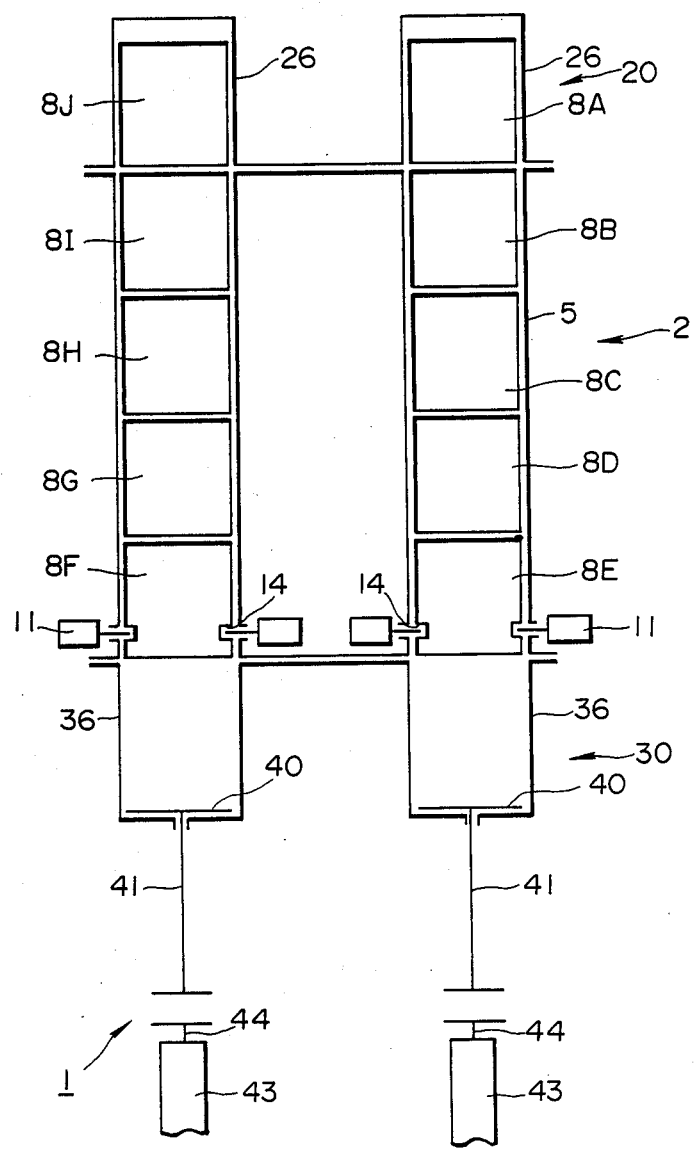
FIGS. 6 through 10 show the manner in which the receptacles are circulated through the system.

With reference to FIGS. 1 and 5, a lower rotary casig 30 comprises a disk 31 which is held in contact with the lower surface of the lower disk 4 and which is hermetically sealed therewith by means of O-rings 32. The disk 31 has two diametrically opposed apertures 31a and at its center a fixed shaft 33 which is journaled within the lower disk 4 of the central casing 2 through means of a bearing assembly 34 and which is connected to a motor 35. Upon actuation of the motor 35, the lower rotary casing 30 is rotated about the axis of shaft 33. Two columns 36 extend downwardly from the lower surface of the disk 31. Each column 36 has an upper end which is in communication with the aperture 31a and a lower end which is closed by means of a cover 37. In its normal operating orientation, the columns 36 are each in communication with the columns 5 through means of the apertures 4a of the lower disk 4 and the apertures 31a of the disk 31. In the illustrated embodiment, the columns 36 are each sized so as to receive one receptacle therewithin. Disposed within each column 36 is a support disk or plate 40 having a rod 41 which extends downwardly through an aperture 37a of the cover 37. Two lifters 43 in the form of a cylinder are respectively located beneath the columns 36 and have rods 44 extending outwardly from the upper ends thereof. Extension of each rod 44, therefore causes each support plate 40 to make upwardly, whereas retraction of each rod 44 causes reverse or downward movement of each support plate 40.

A controller 50 is connected so as to control the motors 25, 35 as well as to the power cylinders 11, 43 through means of suitable valve assemblies 52, 54, respectively. The controller 50 is of conventional structure and will not be explained further.

Figures 7, 8, 9:
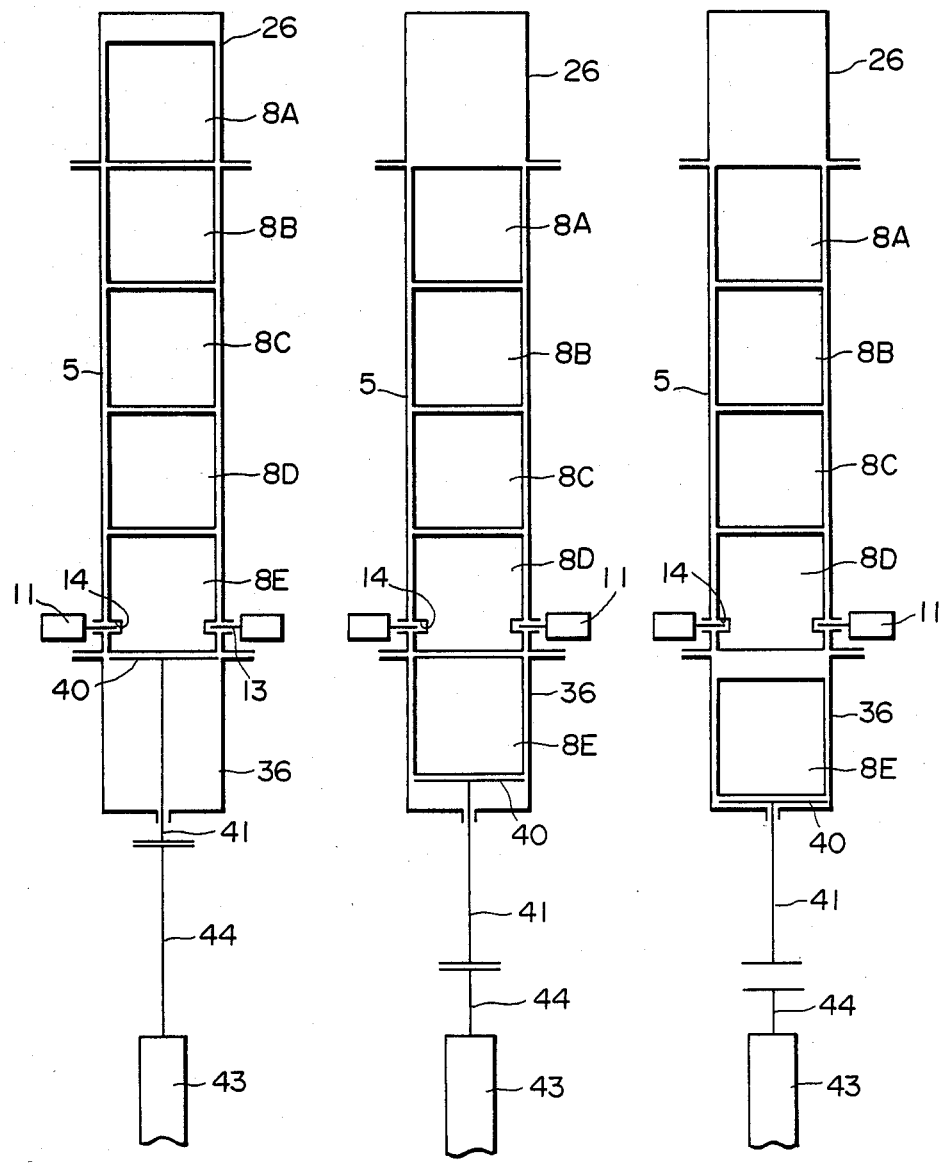
Figure 10:
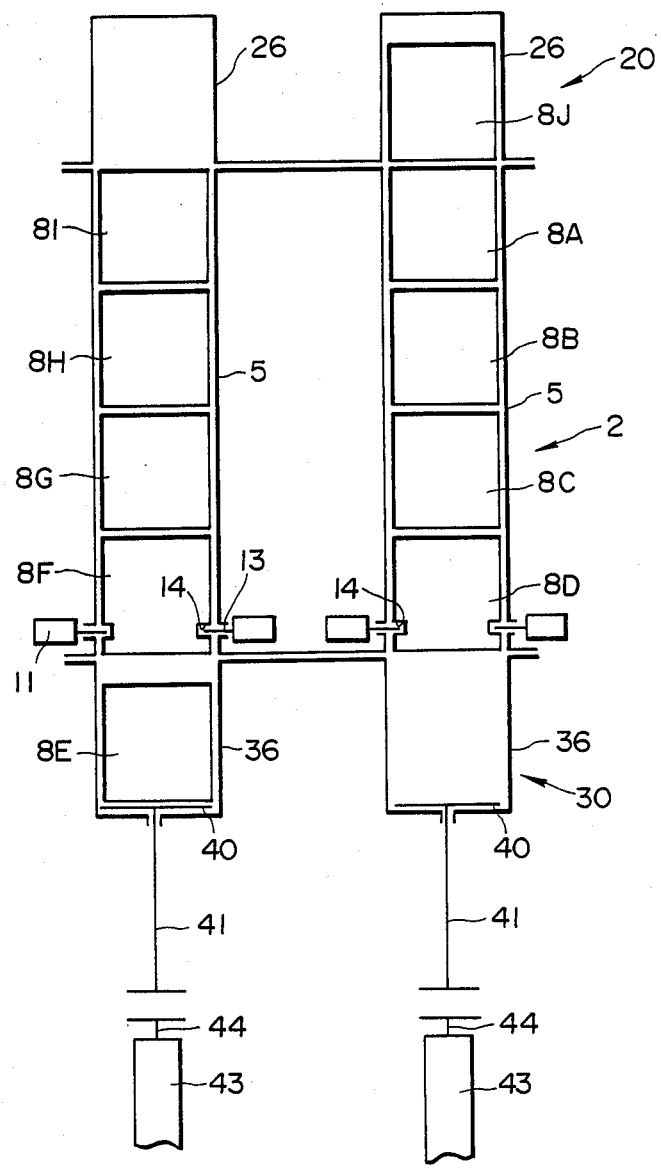

Reference is now made to FIGS. 6 through 10 in which ten receptacles 8A to 8J are circulated through the system 1. As shown in FIG. 7, the rod 44 of the right-hand cylinder 43 is extended so as to raise the support plate 40 until the top surface of the support plate 40 is brought into contact with the bottom of the receptacle 8E. The holders 11 are, then, enabled so as to retract the rods 13, so that the receptacles 8A to 8E are all supported by means of the support plate 40. The rod 44 is then lowered so as to place the receptacle 8E within the column 36, and the rods 13 are extended into the recesses 14 of the receptacle 8D so as to hold the remaining four receptacles 8A to 8D in position within the column 5 (see FIG. 8). The rod 44 of the lifter 43 is then lowered still further so as to place the receptacle 8E at the bottom of the column 36, and then disengaged from the rod 41 of the support plate 40 (see FIG. 9). Thereafter, the motor 25 is actuated in a controlled manner so as to rotate the upper casing 20 through an anguolar movement of 180°, for example in a clockwise direction, so as to place the receptacle 8J atop the receptacle 8A. At the same time, the motor 35 is also actuated in a controlled manner so as to rotate the lower casing 30 through an angular movement of 180° in the same direction so as to move the receptacle 8E beneath the receptacle 8F (see FIG. 10). This operation is continuously effected so as to circulate the receptacles 8A to 8J through the columns 5, 26 and 36.

Figure 11:
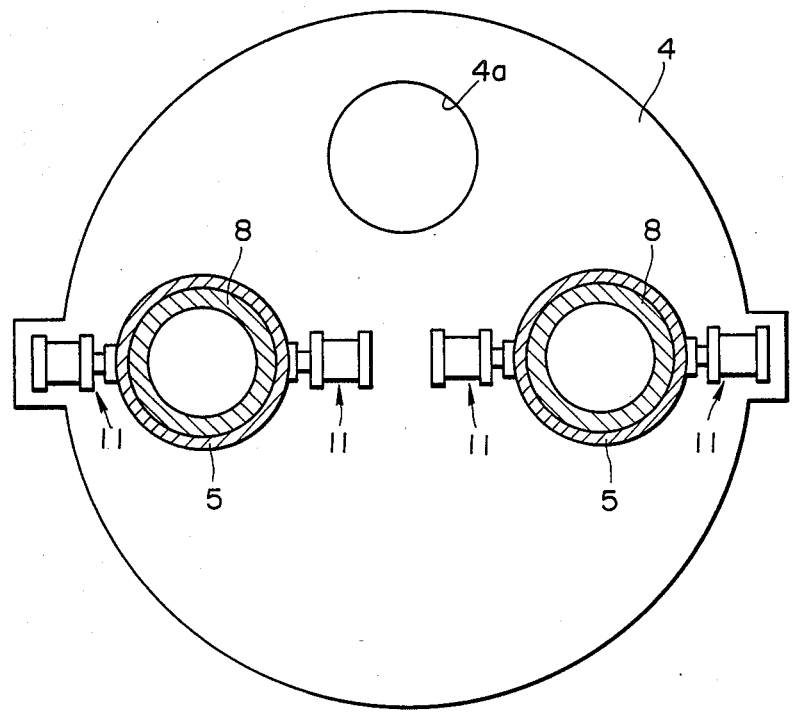
FIG. 11 is a view similar to FIG. 2, but showing a modified form of the lower disk.

As shown in FIG. 11, the lower disk 4 of the central casing 2 may include an opening 4a through which the receptacles 8 are removed from the system 1 or new receptacles are supplied in the system 1. This arrangement is advantageous in that absorbent or other another type of agent is readily exchangeable.

Figure 12:
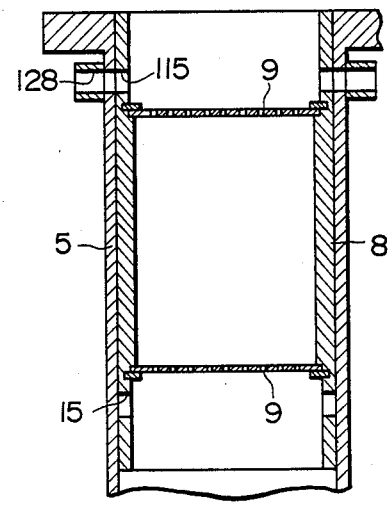
FIG. 12 is a view similar to FIG. 3, but showing a modification of the column.

As shown in FIG. 12, ports 128, in place of the ports 28, may be formed within the upper portions of the columns 5. In this case, the ports 128 can be directly connected to a source of fluid S, and provision of the rotary joint 29 is no longer necessary. But, additional openings 115 are required within the upper portions of the receptacles 8 so as to communicate with the ports 128.

Figure 13:
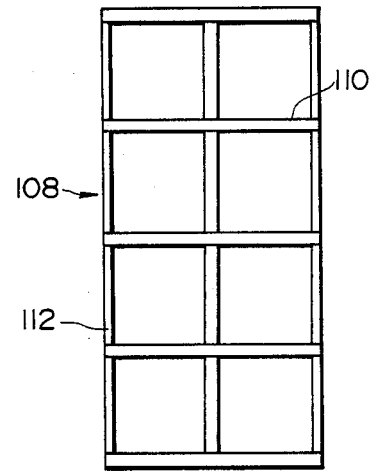

FIGS. 13 through 16 show modifications of the receptacle shown in FIG. 1. As shown in FIG. 13, a receptacle 108 may be formed by means of a plurality of rings 110 connected together by means of a plurality of vertical members 112. A bag (not shown) in the form of a net is placed within the receptacle 108, and absorbent or other agent is contained therein. Alternatively, a receptacle 208 may be constituted by means of two different parts: an upper section 210 in which a chamber 212 is defined so as to contain absorbent or other agent therein, and a lower section 214 having openings 215 through which fluid flows (see FIG. 14). As shown in FIGS. 15 and 16, a receptacle 308 may include a vertical central shaft 310, an upper ring 312 surrounding the upper end of the shaft 310 and connected thereto through means of a plurality of radial members 314, and a lower ring 316 surrounding the lower end of the shaft 310 and connected to the shaft 310 through means of a plurality of radial members (not shown). Screens 320, 322 are attached to the upper and lower rings 312 and 316, respectively. A sheet 324, made, for example, of Teflon (TM), surrounds the rings 312 and 316 so as to define a chamber 326 in which absorbent or other agent is contained. This sheet 324 serves not only as a seal, but also as a lubricant.

Figure 17:
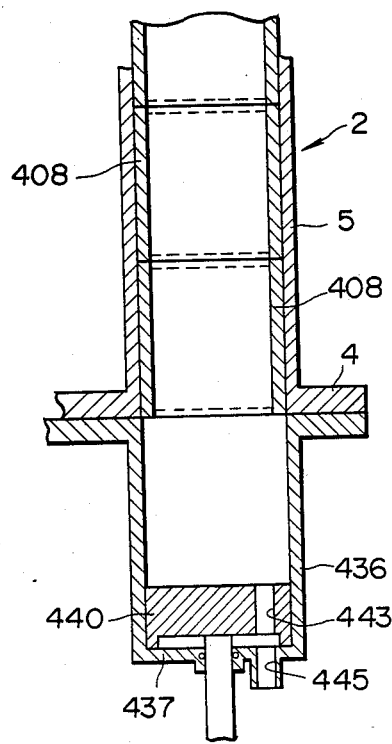
FIG. 17 is an enlarged sectional view of a lower casing in modified form.

With reference to FIG. 17, a plurality of receptacles 408 disposed within the column 5 are similar in structure, but slightly larger tha the upper section 210 of the receptacle 208. The receptacles 408 provide a larger volume for the chambers. In this case, fluid may flow out of the system through means of passages 443 formed within support plates 440 and ports 445 formed within covers 437.

Figure 18:
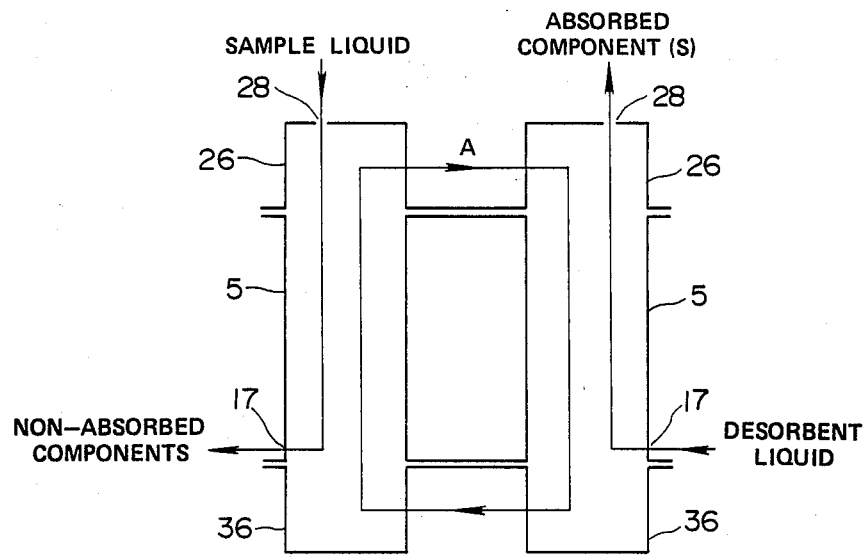
Figure 19:
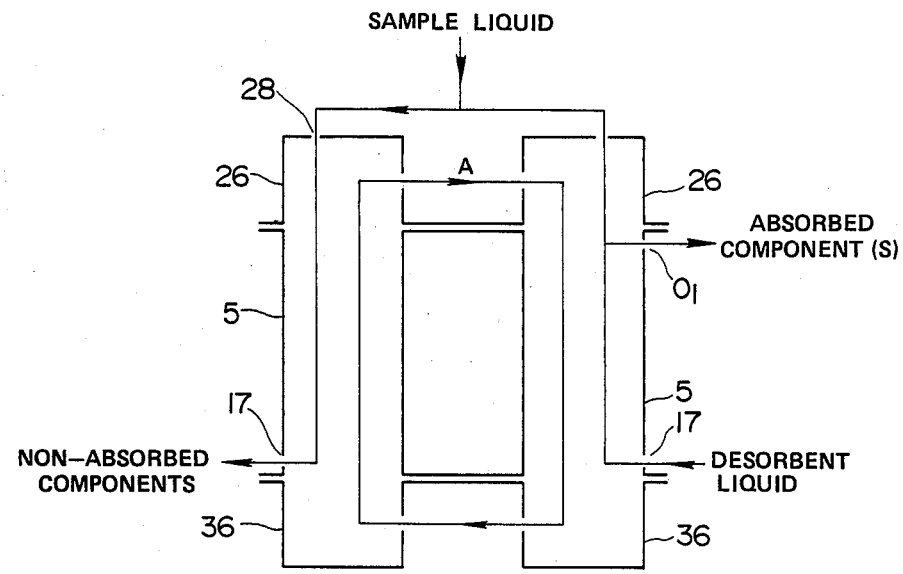

FIGS. 18 through 24 schematically show the system in use. In FIG. 18, suitable absorbent such as activated carbon or an ion exchanger is contained within the receptacles 8 which are circulated through the columns in a direction as indicated by the arrow A. In this example, absorption takes place within the left-hand columns whereas desorption takes place within the right-hand columns. More specifically, a sample in liquid form is first introduced into the system through means of the port 28 within the left-hand column 26. A specific component or a group of components is then absorbed within the absorbent, and the liquid sample flows out of the system through the means of the port 17 within the left-hand column 5. The absorbent disposed within the receptacles 8 is moved to the right-hand columns and is brought into contact with desorbent liquid which is introduced into the right-hand column 5 through means of its port 17. As a result, the absorbed component or components are removed from the absorbent and collected through means of the port 28 of the right-hand column 26. When one of the receptacles 8 is moved from the left-hand column to the top of the right-hand column, some of the non-absorbed components still remain within the receptacle. To this end, as shown in FIG. 19, after the absorbed component or components are collected through means of an outlet O1, the receptacle is stopped for a while or slowed, so that the non-absorbed components may be returned to the left-hand columns with the disorbent liquid.

Figure 20:
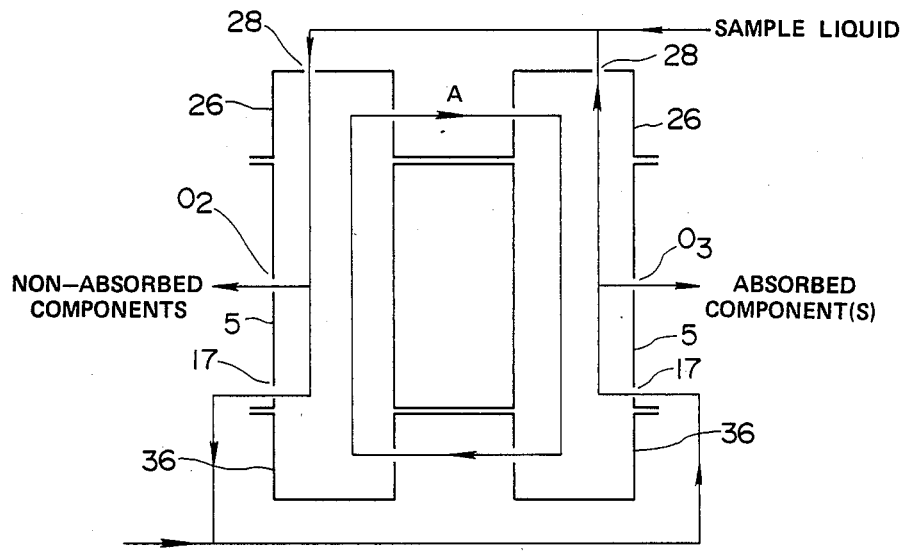

In FIG. 20, the sample liquid comprises two different components J, K, the component J being greater in absorptivity than the component K. The component K therefore moves faster than the component J as the sample liquid flows through the left-hand column 5. If the receptacles 8 are moved upwardly within the left-hand column at a rate faster than the movement of the component J through the column, but slower than the movement of the component K through the column, then the component J is absorbed through the column within the absorbent and transferred to the right-hand column, whereas the component K is discharged from the left-hand column through means of an outlet O2. The absorbed component or components within the receptacle as transferred to the top of the right-hand column are then brought into contact with desorbent liquid introduced into the right-hand column 5 through means of the port 17 and collected through the means of an outlet O3. At this time, non-absorbed components within the same receptacle are returned to the left-hand column with the desorbent liquid.

Figure 21:
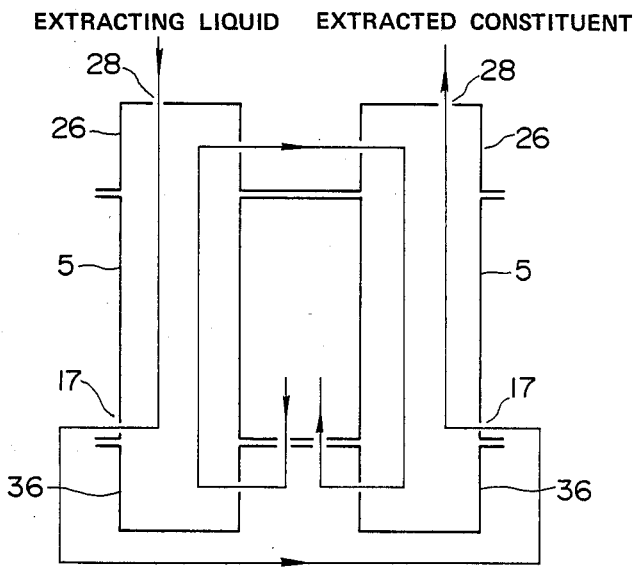

In FIG. 21, coffee beans, for example, are contained within the receptacles 8 which are circulated through the columns. Used coffee beans must be replaced with the new coffee beans. To this end, the receptacles 8 can be removed from and again supplied to the columns through means of the opening 4a as shown in FIG. 11 so as to effect such replacement. When extracting liquid, such as hot water and the like, the solvent properties for only one of the constituents is introduced into the left-hand column through means of the port 28, the specific constituent is dissolved and carried out of the system through means of the port 28 of the right-hand column 26.

Figure 22:
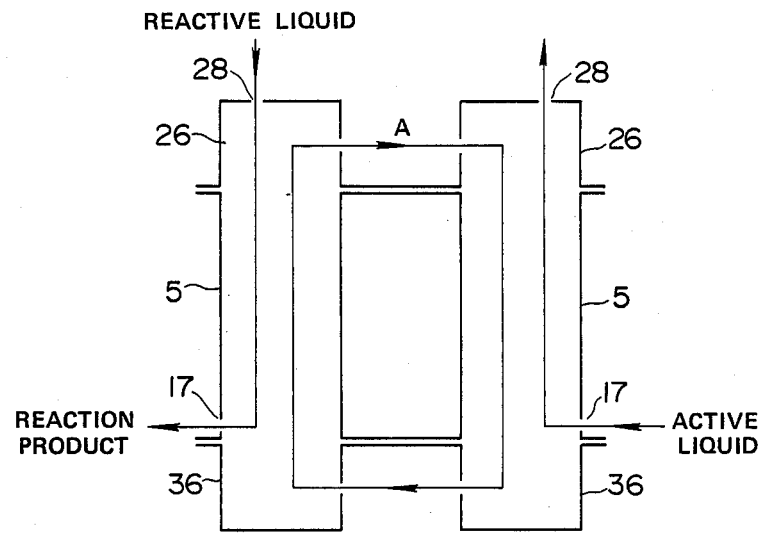
Figure 23:
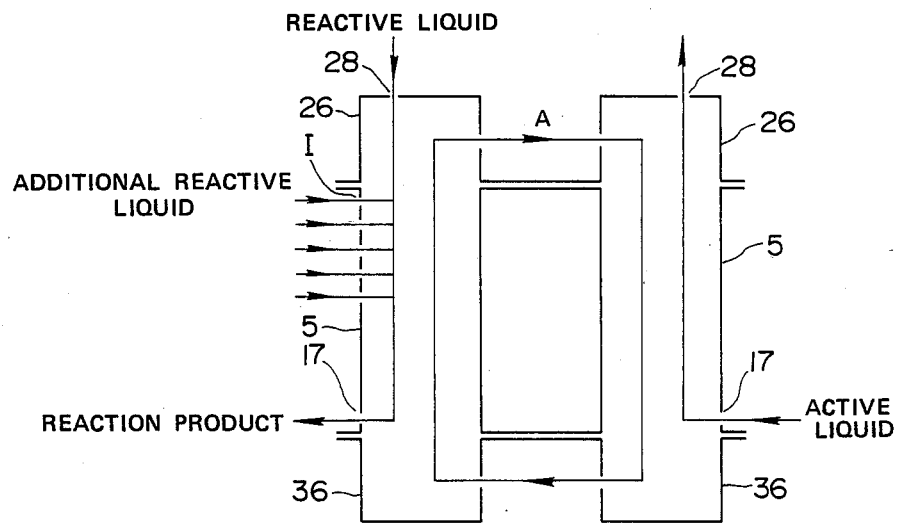

In FIG. 22, an immobilized enzyme, for example, is contained within the receptacles 8 which are circulated through the columns in a direction as indicated by the arrow A. When reactive liquid is introduced into the left-hand columns and is contacted with the immobilized enzyme within the receptacles 8, a reaction product is produced and is subsequently collected from the system through means of the port 17. Within the right-hand columns, a specific liquid is introduced into the columns through means of the port 17 so as to activate the immobilized enzyme within the receptacles 8. As shown in FIG. 23, if additional reactive liquid is supplied to the left-hand column 5 through means of a plurality of inlets I, more reaction product is obtainable.

With reference to FIG. 24, four of the systems (only three are shown) as shiown in FIG. 19 may be combined so as to successively separate four different components or constituents L, M, N and P.

FIG. 25 shows a modified form of the rotary joint. The rotary joint 70 comprises an upper disk 71 having two vertically extending passageways 72, 73, and a lower disk 74 having two vertically extending passageways 75, 76. In the illustrated embodiment, the passageways 72, 73 are in communication with the passageways 75, 76, respectively. When either one of the disks is rotated relative to the other disk, the passageways 72, 73 are then brought into communication with the passageways 76, 75, respectively. With this rotary joint 70, two different fluids may be used, one flowing through one of the columns 5 while the other flows through the other column.

FIG. 26 shows a modified form of the lower casing. Pistons 80 are disposed within columns 81 (only one is shown). Each column 81 has at its bottom an opening 82 which is connected to a hydraulic circuit 83. The hydraulic circuit 83 has a valve assembly 84 which is, in turn, controllably operated by means of the controller 50.

Figure 28:
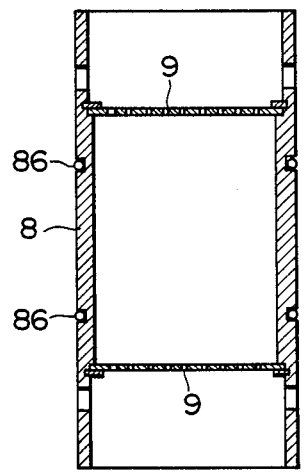
FIG. 28 is an enlarged sectional view of the receptacle and its O-rings.
Figure 27:
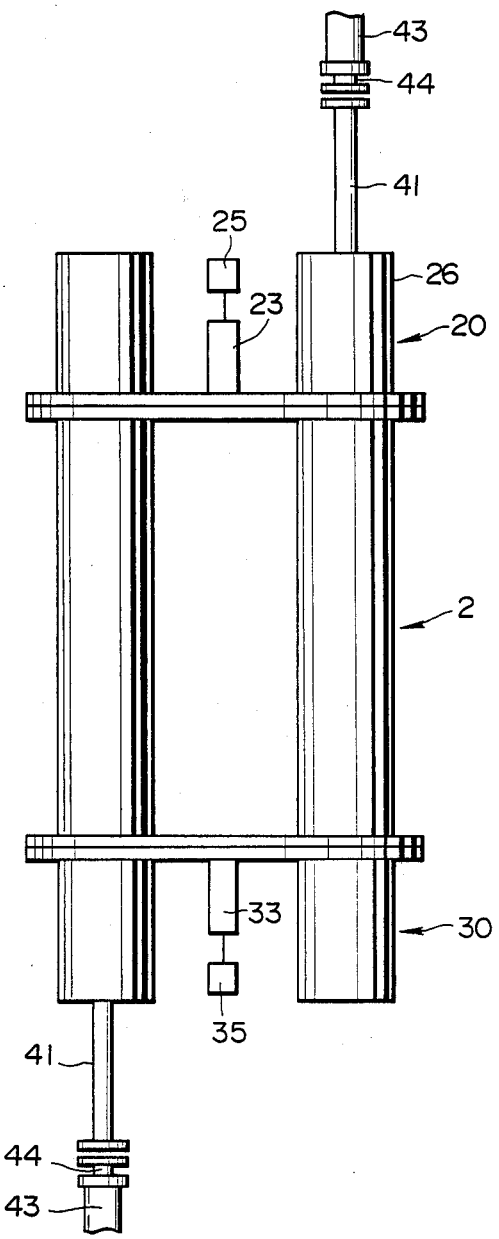
FIGS. 27 and 29 are alternative forms of the sysktem shown in FIG. 1.
Figure 29:
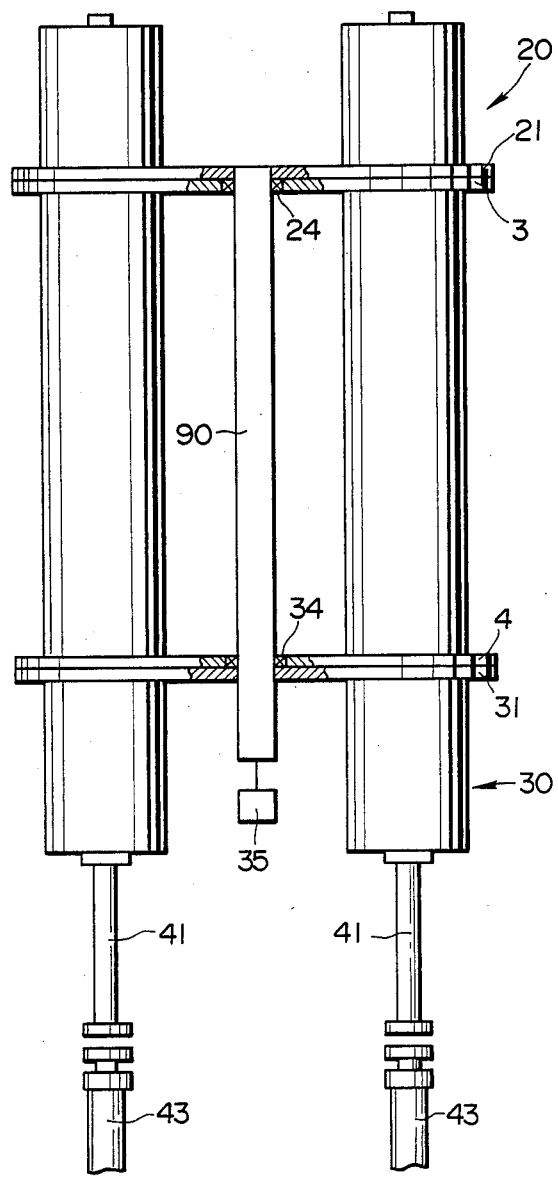
Figure 30:
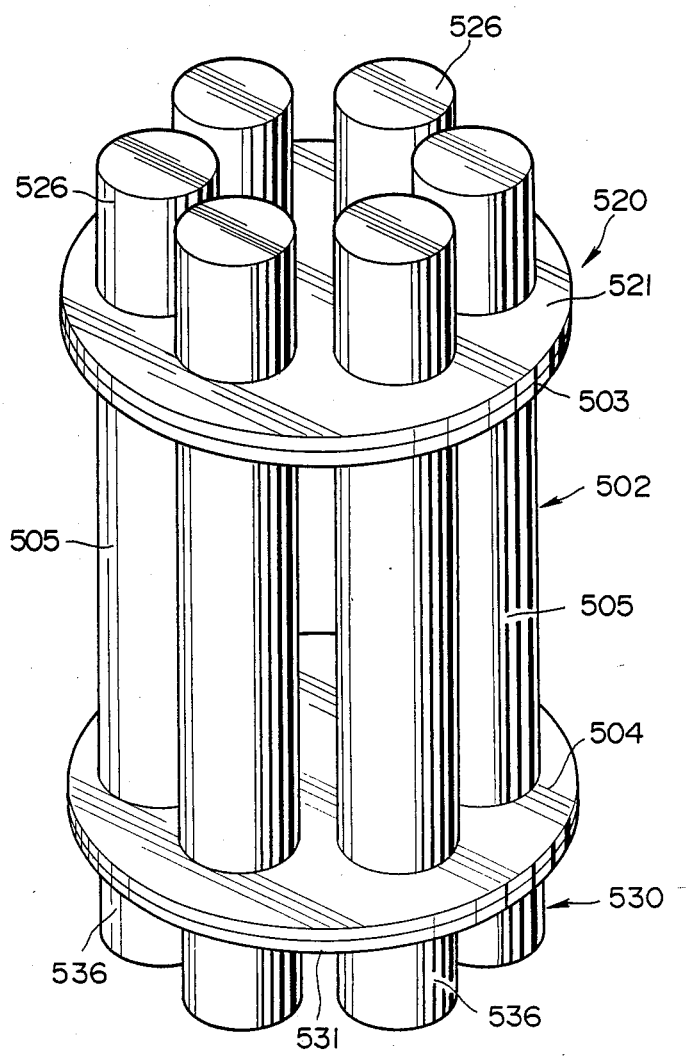
FIG. 30 is an alternative form of the system shown in FIG. 1.

Alternative forms of the invention are shown in FIGS. 27, 29 and 30 wherein parts similar to those shown in FIG. 1 are identified with the same reference numerals. As shown in FIG. 27, one of the lifters 43 is operatively connected to one of the columns 26 of the upper casing 20 within which the receptacles are moved downwardly. This arrangement is particularly advantageous when a suitable number of O-rings 86 (see FIG. 28) are disposed within the outer peripheral surface of each receptacle 8 whereby the receptacle 8 may not be moved downwardly by means of its own weight due to friction. In the illustrated embodiment shown in FIG. 29, a vertical shaft 90 extends from the disk 21 of the upper casing 20 to the disk 31 of the lower casing 30 and has a lower end connected to the motor 35. With reference to FIG. 30, the system includes a fixed central casing 502 having upper and lower disks 503, 504 between which six circumferentially arranged equally spaced columns 505 extend. A rotary upper casing 520 has a disk 521 disposed in contact with the upper disk 503 of the central casing 502, and six circumferentially arranged, equally spaced columns 526 communicatable with the six columns 505. Likewise, a rotary lower casing 530 has a disk 531 disposed in contact with the lower disk 504 of the central casing 502, and six circumferentially arranged, equally spaced columns 536 communicatable with the columns 505. The upper and lower casings 520, 530 are rotatable through means of an angular displacement of 60° each time a drive means (not shown) is actuated. In the case that the upper and lower casings 520, 530 are rotated in the same direction, the receptacles are first moved upwardly within the column, transferred to the adjacent column, and then moved downwardly. The receptacles are eventually circulated throughout all of the columns. On the other hand, if the upper and lower casings 520, 530 are rotated in opposite directions, the receptacles are circulated through two adjacent columns only. In the latter example, three different separations are possible.

Although particular embodiments of the invention have been described and illustrated herein, it is to be understood that modifications and variations may readily occur to those skilled in the art. Therefore, it is intended that the appended claims be interpreted to cover such modifications and equivalents.

What is claimed is:

1. A separator for separating at least one component from a fluid, comprising:
    a central casing including an upper disk and a lower disk, both disks having a plurality of openings defined therein, and a plurality of columns extending between said upper and lower disks and in communication with said plurality of openings of said upper and lower disks;
    an upper casing including a disk disposed in contact with said upper disk of said central casing and having a plurality of openings defined therein, and a plurality of columns extending upwardly from the upper surface of said disk of said upper casing and in communication with said plurality of columns of said central casing;
    a lower casing including a disk disposed in contact with said lower disk of said central casing and having a plurality of openings defined therein, and a plurality of columns extending downwardly from the lower surface of said disk of said lower casing and in communication with said plurality of columns of said central casing;
    a plurality of receptacles, for containing material for causing said separation of said at least one component from said fluid, disposed within said plurality of columns of said upper, central, and lower casings;
    means for moving said receptacles through said plurality of columns of said upper, central, and lower casings;
    means for rotating said upper and lower casings about respective central axes thereof; and
    a plurality of ports communicating with at least said plurality of receptacles disposed within said central casing for introducing and removing said fluid and said at least one separated component into and out of said separator.

2. A separator as set forth in claim 1, wherein:
    said material is an absorbent.

3. A separator as set forth in claim 1, wherein:
    said means for moving said receptacles through said plurality of columns of said upper, central, and lower casing comprises means for moving said receptacles axially through said plurality of columns of said upper, central, and lower casings in vertical directions both upwardly and downwardly.

4. A separator as set forth in claim 1, wherein:
    said means for moving said receptacles comprises piston-cylinder means disposed beneath each of said columns of said lower casing.

5. A separator as set forth in claim 4, further comprising:
    means for lockingly supporting said receptacles within said central casing at predetermined axial positions.

6. A separator as set forth in claim 5, wherein said means for lockingly supporting said receptacles comprises:
    aperture means defined within a peripheral wall portion of each of said receptacles; and
    piston-cylinder means supported upon said central casing wherein piston rods of said piston-cylinder means operatively engage said aperture means of said receptacles in order to secure said receptacles within a locked mode.

7. A separator as set forth in claim 6, further comprising:
    motor drive means for rotatably actuating said means for rotating said upper and lower casings.

8. A separator as set forth in claim 7, further comprising:
    control means for controlling said motor drive means, said piston-cylinder means for lockingly supporting said receptacles within said central casing, and said piston-cylinder means for moving said receptacles axially within said plurality of columns.

9. A separator as set forth in claim 1, wherein:
    two, diametrically opposed columns are defined within each of said upper, central, and lower casings; and
    said means for rotating said upper and lower casings includes means for rotating said upper and lower casings through an angular displacement of 180° such that said receptacles can be transferred from one column of said central casing to the other column of said central casing by rotation of said upper and lower casings between diametrically opposed positions.

10. A separator as set forth in claim 1, further comprising:
    port means defined within said lower disk of said central casing through which receptacles may be inserted or discharged so as to interchange said receptacles disposed within said columns of said upper, central, and lower casings.

11. A separator as set forth in claim 1, further comprising:
    screen means disposed within upper and lower end portions of said receptacles for defining a chamber within which said material for causing said separation of said at least one component is housed.

12. A separator as set forth in claim 1, said receptacles comprising:
    cage means, defined by horizontally disposed annular rings and vertically extending support members interconnecting said annular rings together, for housing net means within which said material for causing said separation of said at least one component is contained.

13. A separator as set forth in claim 1, further comprising:
- means for supplying a fluid from which said at least one component is to be separated; and
- rotary joint means interposed between said fluid supplying means and said plurality of columns of said upper casing so as to permit said upper casing to rotate relative to said fluid source.

14. A separator as set forth in claim 13, wherein said rotary joint means comprises:
- an upper disk;
- two parallel fluid passageways defined within said upper disk;
- a lower disk relatively rotatable with respect to said upper disk between first and second positions; and
- two parallel fluid passageways defined within said lower disk for alignment of a first fluid passageway of said lower disk with a first fluid passageway of said upper disk, and for alignment of a second fluid passageway of said lower disk with a second fluid passageway of said upper disk, when said lower disk is disposed at said first position relative to said upper disk; and wherein said first fluid passageway of said lower disk is aligned with said second fluid passageway of said upper disk, and said second fluid passageway of said lower disk is aligned with said first fluid passageway of said upper disk, when said lower disk is disposed at said second position relative to said upper disk.

15. A separator as set forth in claim 3, wherein:
- said means for moving said receptacles axially within said plurality of columns comprises piston means disposed within bottom portions of said lower casing columns;
- port means defined within a lower end wall of said lower casing for fluidic communication with a piston chamber beneath said piston means; and
- hydraulic circuit means fluidically connected to said port means of said lower end wall.

16. A separator as set forth in claim 3, wherein:
- said means for moving said receptacles comprises piston-cylinder means respectively disposed above and below said columns of said upper and lower casings.

17. A separator as set forth in claim 1, wherein:
- six, circumferentially arranged, equally spaced columns are defined within each of said upper, central, and lower casings; and
- said means for rotating said upper and lower casings include means for rotating said upper and lower casings through an angular displacement of 60° so as to permit said receptacles to be transferred between at least two of said columns of said upper, central, and lower casings.

18. A separator as set forth in claim 7, wherein said motor drive means comprises:
- first motor drive means operatively connected to said upper casing;
- second motor drive means operatively connected to said lower casing,
- whereby said first and second motor drives, and upper and lower casings, are independently operated.

19. A separator as set forth in claim 7, wherein said motor drive means comprises:
- a single motor drive means; and
- shaft means operatively connected to both said upper and lower casings, and to said single motor drive means,
- whereby said upper and lower casings are rotated together by said single motor drive means.

* * * * *